April 12, 1960 J. C. SIMS, JR 2,932,278
SINGLE PRINT MAGNETIC PRINTER
Filed May 3, 1955
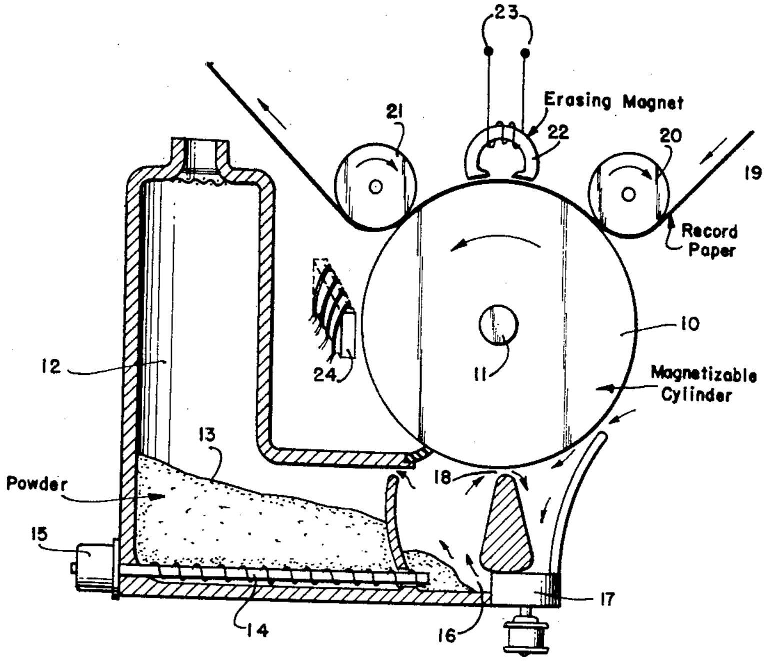
INVENTOR.
JOHN C. SIMS, JR.
BY
Charles C. English
AGENT United States Patent Office 2,932,278

Patented Apr. 12, 1960

2,932,278

SINGLE PRINT MAGNETIC PRINTER

John C. Sims, Jr., Springhouse, Pa., assignor to Sperry Rand Corporation, New York, N.Y., a corporation of Delaware Application May 3, 1955, Serial No. 505,708

5 Claims. (Cl. 118—637)

The present invention relates to printing and printing devices, and is more particularly concerned with a method and apparatus for effecting printing by utilizing magnetic principles. In this respect, the present invention is primarily concerned with a method and apparatus for effecting single prints by magnetic printing techniques.

Reference is made to the copending application of John Presper Eckert, Jr. and J. C. Sims, Jr., Serial No. 221,362, filed April 17, 1951, for: "Method and Apparatus for Magnetic Printing"; and to the copending application of John Presper Eckert, Jr. and John C. Sims, Jr., Serial No. 333,574, filed January 27, 1953, for: "High Speed Printer." Each of these applications has been assigned to the assignee of the instant application, and they disclose apparatuses and techniques whereby printing may be effected by employing magnetic principles.

In general, such printing is accomplished by producing a selected pattern of magnetic gradients on the surface of a body such as a magnetic drum. This pattern of magnetic gradients may be effected, in accordance with the foregoing applications, by photoscanning a sheet of material to be reproduced, thereby to derive a series of electrical signals representative of information appearing on the said sheet; and the electrical signals are then coupled to a magnetic transducer mounted closely adjacent a rotatable printing cylinder having a surface of magnetic material whereby a desired magnetic pattern, representative of the said information, is placed on the surface of the said magnetic cylinder. The magnetic cylinder carrying the information pattern of magnetic gradients, is then coated with paramagnetic particles, such as powders of iron, nickel, or cobalt, whereby the said paramagnetic particles are selectively retained on the magnetic drum surface in accordance with the pattern of magnetic gradients previously placed thereon. The paramagnetic particles may take a number of different forms, and may, for instance, be pigment bearing thereby to comprise a powdered ink having magnetic properties; or they may on the contrary be adapted to react chemically, or to act as a catalyst in a chemical reaction, with a suitably treated printing paper sheet or web. When so coated, the magnetic drum or other magnetic surface bearing the desired pattern of gradients, may then be mounted adjacent a paper upon which a print is to be made, and the image corresponding to the pattern of magnetic gradients is then transferred, for instance by rolling contact, to the said printing paper through the agency of the paramagnetic particle coating on the said magnetic surface.

Techniques and apparatuses such as have been described above, are particularly useful in high speed printing applications and find especial value when a substantial number of copies of the subject matter to be reproduced are to be made. It has been found that because of the magnetic retentivity of the paramagnetic particles described above on the drum surface, incomplete transfer of the said particles is effected to a print receiving paper. While such an operational characteristic does not detract from the system when plural copies are to be made, it does impose difficulties when but a single copy is to be made, or wherein continuously occurring information is to be printed by a constant replacement, with new information, of old information appearing on a drum. This difficulty has been alleviated in part by the provision of scrub rollers adjacent the magnetic drum which serve to forcibly remove magnetic particles from the drum subsequent to a printing operation; but inasmuch as such scrub rollers in no way affect the pattern of magnetic gradients appearing on the said drum, the system has still been limited, for the most part, to the production of plural copies and has not lent itself readily to continuous printing techniques or to single print operations.

The present invention serves to obviate the foregoing difficulties and, in essence, provides an erasing field adjacent a printing apparatus operating in accordance with the foregoing techniques, so disposed that the pattern of magnetic gradients appearing on the surface of a magnetic printing drum is removed substantially simultaneously with the print transfer to a print receiving sheet of paper, thereby not only to erase the gradient pattern but also to effect better print transfer through a physical attraction of the paramagnetic particles toward the print receiving paper. It will be understood, of course, that the present invention thus comprises an improvement in the forms of apparatus described in the above identified copending applications and may be utilized as a subcomponent of such apparatus whereby single print operations may be selectively effected as desired.

It is accordingly an object of the present invention to provide a new and improved method and apparatus for printing.

A further object of the present invention resides in the provision of an improved method and apparatus for effecting magnetic printing.

Still another object of the present invention resides in the provision of a method and apparatus for effecting single prints from a magnetic surface.

A still further object of the present invention resides in the provision of an improved printer adapted to high speed reproduction of symbolic and pictorial representations.

Still another object of the present invention resides in the provision of a new and improved method of and apparatus for printing which permits great facility and unlimited changes in representations set up for reproduction without involving a physical reformation or replacement of the intelligence-bearing material.

Another object of the present invention resides in the provision of a new and improved apparatus for printing having high operational efficiency and simplified construction.

A still further object of the invention resides in the provision of a new and improved printing apparatus which is inexpensive to construct and which has low maintenance cost.

The foregoing objects, advantages, construction and operation will become more readily apparent from the subsequent description and accompanying drawing.

Referring now to the accompanying figure, it will be seen that, in accordance with the present invention, a cylinder 10 having a magnetizable surface may be utilized to provide an information-bearing medium. The said cylinder 10 may, as described above, have a pattern of magnetic gradients stored on the surface thereof by means of a separate apparatus preferably of the type utilizing the method of photoscanning the intelligence to be reproduced and employing electrical signals derived therefrom for driving magnetic transducers disposed adjacent the said magnetic cylinder 10.

In practice, the pattern of magnetic gradients may be placed upon the said cylinder 10 after which time the pattern of said magnetic gradients on cylinder 10 is physically transferred from the magnetic transducer outputs of the photoscanning apparatus to a printing apparatus of the type shown in the accompanying drawing, or the said pattern may be placed directly upon the cylinder by a recording head 24, disposed as shown. The cylinder may be mounted on an axle 11 for continuous rotation, and a powder supply may be disposed adjacent one portion of the periphery of cylinder 10 for the selective deposition of a paramagnetic powder on the said surface. The powder supply has been described at length in copending application Serial No. 221,362, identified above, and comprises in one form thereof, a reservoir chamber 12 having a powder supply 13 therein, a feeding mechanism 14 driven by a motor 15 and adapted to supply portions of the powder 13 to a suspension chamber 16, and a blower 17 in the said suspension chamber causing the said powder supply to be circulated as shown through a gap 18 adjacent the surface of drum 10. By this arrangement, paramagnetic material in powder form is continuously maintained in suspension adjacent the rotating surface of cylinder 10 whereby the said powder is selectively retained on the said surface in accordance with the pattern of magnetic gradients appearing thereon.

A record paper 19, which may be untreated or in the alternative chemically treated, depending upon the nature of powder 13, may then be placed in contact with a further portion of the periphery of cylinder 10 and is moved with respect to the said periphery while being retained in close physical contact therewith through the medium of rotating pressure rollers 20 and 21 disposed as shown.

In accordance with the present invention a magnetic transducer 22 may also be disposed adjacent the surface of cylinder 10 in the region of print transfer and the said transducer 22 is supplied from a source of potential 23 whereby the said transducer 22 acts as an erasing field adjacent cylinder 10. By this arrangement, powder 13 is placed on the surface of drum 10 adjacent the gap 18 and is then carried to a further position adjacent record paper 19 whereby it is transferred to the said record paper 19 or chemically reacts with the said paper 19 to effect a print image thereon. Substantially simultaneous with the print transfer, the erasing field of transducer 22 is imposed upon the surface of cylinder 10 to remove the pattern of gradients thereon, thus permitting but a single print of information to be obtained; or in the alternative, to permit new information, supplied for instance to recording head 24, to replace old information originally appearing on the said surface of cylinder 10. Furthermore, due to attraction of the paramagnetic powder 13 appearing on the cylinder 10 by transducer 22, a more complete transfer of the print to record paper 19 may be effected. By this arrangement, therefore, single prints of extremely good definition may be readily obtained.

The recording head 24 may take the form of a multichannel comb type head disposed adjacent the surface of cylinder 11 between the roller 21 and the dusting chamber. The construction and operation of such heads has already been discussed in copending application Serial No. 333,574, identified above. When such recording heads are employed in conjunction with an erasing magnet such as 22, however, particularly excellent results are achieved by disposing the recording and erasing fields at right angles to one another with respect to the direction of motion of the drum surface 10. Thus, in the figure, the erasing magnet 22 is so oriented that its gap is orthogonal to the surface motion of cylinder 10, while the recording head 24 has its gaps parallel to the surface motion. Image signals are therefore recorded by magnetic flux at right angles to the motion of drum 10, and are subsequently erased, at magnet 22, by fields parallel to this motion. This technique affords lower noise (background haze and ghosts) and is equally applicable for this reason to recording and playback of sound records.

While I have described a preferred embodiment of the present invention, it will be understood that many modifications may be suggested to those skilled in the art, for example, in respect to the disposition of the record paper and erasing magnet with respect to the surface of magnetic cylinder 10. In addition, the said cylinder 10 may, if desired, take the form of a continuous magnetic web; and other arrangements for the deposition of paramagnetic particles on the said surface may be employed. The foregoing is, therefore, meant to be illustrative only and is not limitative of my invention, and all such modifications as are in accord with the principles discussed are, therefore, meant to fall within the scope of the appended claims.

Having thus described my invention, I claim:

1. In a printing apparatus, a rotatable drum having peripheral surface areas of selected magnetization, means adjacent the periphery of said drum at a first rotational location thereof for distributing paramagnetic particles over said surface areas, a print receiving medium adjacent the periphery of said drum at a second rotational location thereof, and an erasing magnet adjacent said drum at said second rotational location for erasing said surface areas of selected magnetization in a direction substantially orthogonal to the direction of said areas of selected magnetization simultaneously with a print transfer of said particles to said medium.

2. In a printing apparatus, a body having a surface of magnetizable material, means for selectively applying areas of magnetization to said surface, field producing means adjacent said body for selectively erasing said selected areas of magnetization of said surface, said field producing means producing an erasing field which is substantially orthogonal to the magnetization field applied by said means for applying said areas of magnetization and a print receiving medium selectively contiguous with said body and responsive to said particles for effecting a print transfer to said medium substantially simultaneous with the erasing of said surface areas.

3. In a printing apparatus, a movable body having a magnetizable surface, means for magnetizing selected areas of said surface, means for applying paramagnetic particles to said selected surface areas, magnetic field producing means adjacent said body, means for moving a print receiving medium to be contiguous with said body and disposed, at contiguity, between said body and said field producing means and, means for energizing said field producing means so that it magnetically erases said surface areas and simultaneously attracts said particles from said surface areas toward said medium thereby to effect a print transfer.

4. The apparatus of claim 3 wherein said movable body comprises a rotatable drum.

5. In a printing apparatus, the combination of a rotatable drum having a magnetizable surface, means for moving said surface cyclically to first, second, and third locations, means adjacent said first location for selectively magnetizing certain areas on said drum in a certain direction, means adjacent said second location for distributing magnetically attractable particles upon said surface areas in accordance with the magnetization thereof, means for positioning a print receiving medium adjacent said body at said third location to effect a print transfer of said particles, and erasing means comprising a magnetic transducer mounted adjacent said rotatable drum at said third location, said erasing means tending to demagnetize said surface along a direction substantially orthogonal to said direction of said means for selectively magnetizing whereby a clean erasure of the magnetized areas may be effected.

(References on following page)

References Cited in the file of this patent

UNITED STATES PATENTS

| | | |
|---|---|---|
| 1,820,194 | Huebner | Aug. 25, 1931 |
| 2,573,881 | Walkup et al. | Nov. 6, 1951 |
| 2,635,149 | Cain | Apr. 14, 1953 |
| 2,657,932 | Blaney | Nov. 3, 1953 |
| 2,841,461 | Gleason | July 1, 1958 |

FOREIGN PATENTS

| | | |
|---|---|---|
| 295,406 | Germany | Nov. 21, 1916 |
| 689,851 | France | June 3, 1930 |

OTHER REFERENCES

Mechanics Magazine, vol. 131, No. 835, p. 342, 1839.

G.E. Review (pp. 20–22, 61), Ferromagnetography-High Speed, July 1952.